United States Patent [19]

Mehra et al.

[11] 4,357,240

[45] Nov. 2, 1982

[54] DISPOSABLE, ONE-PIECE FILTER UNIT

[75] Inventors: Ravinder C. Mehra, Fairport; Heinz W. Hahn, Rochester; Raj K. Aggarwal, Penfield, all of N.Y.

[73] Assignee: Sybron Corporation, Rochester, N.Y.

[21] Appl. No.: 238,818

[22] Filed: Feb. 27, 1981

[51] Int. Cl.³ .............................................. B01D 23/02
[52] U.S. Cl. .................................. 210/455; 210/466; 210/472; 422/101; 422/102
[58] Field of Search ..................... 156/73.1, 242, 294; 210/436, 446, 451, 455, 466, 469, 474, 477, 472; 264/DIG. 48; 422/101, 102

[56] References Cited

U.S. PATENT DOCUMENTS 3,295,686  1/1967  Krueger .............................. 210/455
4,180,383  12/1979  Johnson .............................. 422/101

Primary Examiner—Ivars C. Cintins
Attorney, Agent, or Firm—Theodore B. Roessel; Roger Aceto

[57] ABSTRACT

A disposable filtration unit wherein the body of the unit is a unitary, one-piece molded structure having an internal flange for dividing the unit into an upper and lower chambers, the flange also providing means for supporting the filter medium.

10 Claims, 3 Drawing Figures

DISPOSABLE, ONE-PIECE FILTER UNIT

BACKGROUND OF THE INVENTION

The present invention relates to a disposable filter unit. More particularly, the invention is a filter unit wherein the reservoir for the liquid to be filtered and the receptacle for receiving the filtrate are formed as a unitary one piece unit.

Filtration units of the type described herein are used in a wide variety of laboratory applications. Consequently, it is desirable that the unit be in a sterile condition prior to use. U.S. Pat. No. 3,295,686 discloses such a disposable filter unit which eliminates many of the drawbacks of reusable filter units described as prior art in that patent.

A disposable filter unit according to U.S. Pat. No. 3,295,686 would consist of a reservoir for holding the liquid to be filtered, a separate receptacle for receiving the filtrate and a support member for holding the filter medium. These three components would be assembled as by welding to form a unitary structure. This construction required that the different components be provided with appropriate structure to permit the components to be fitted together and attached one to another. Moreover, in such construction, care had to be exercised in order to insure an air-tight seal about the filter medium so as to prevent leakage of air from the surrounding environment into the filtrate receptacle.

The present invention overcomes many of the drawbacks of prior art disposable filtration units by providing a one-piece molded unit which not only greatly reduces the manufacturing steps, but also provides a filtration unit wherein there is no possibility for leakage of air into the filtrate receptacle.

SUMMARY OF THE INVENTION

The disposable filtration unit according to the present invention may be characterized in one aspect thereof by the provision of a unitary, one-piece plastic molded body, generally cylindrical in shape, having a closed bottom and open top. The unit has an internal annular shoulder which divides the unit into an upper reservoir for the liquid to be filtered and a lower receptacle for the filtrate. The opening defined by the shoulder is adapted to receive the support for the filter medium, which is fitted into the opening. Also formed integral the one piece body is a pouring spout and breather tube. This breather tube in the assembled unit communicates with the lower receptacle at the farthest most point from the pouring spout so as to prevent active contact of liquid in the receptacle with air entering the receptacle as liquid is being poured from the receptacle.

DESCRIPTION OF THE PREFERRED EMBODIMENTS

Figure 1:
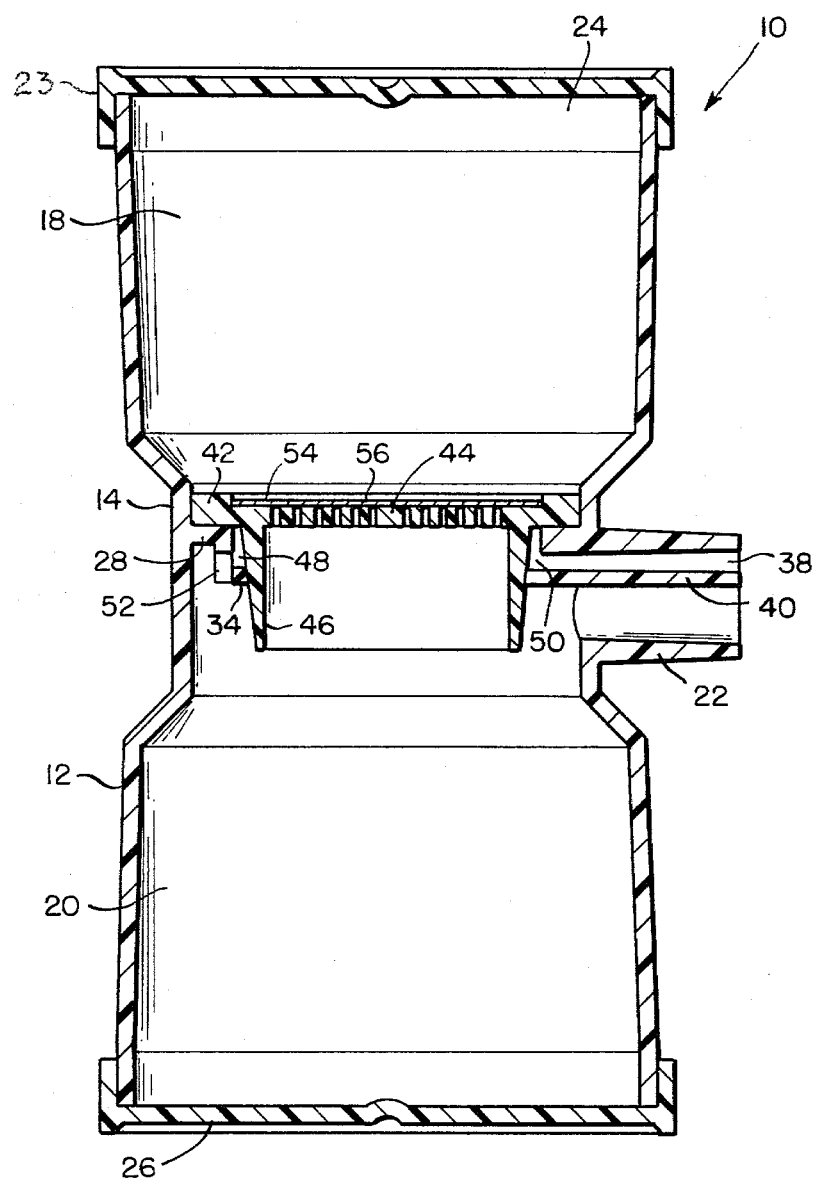
FIG. 1 is a elevation view in section showing the disposable filtration unit of the present invention.

Referring to the drawings, FIG. 1 shows the filtration unit of the present invention generally indicated at 10. The unit is formed by a generally cylindrical side wall 12 which has an intermediate necked portion 14. This necked portion divides the filtration unit into an upper reservoir 18 for containing the liquid to be filtered, and a lower receptacle 20 for receiving the filtrate.

A pouring spout 22 extending from and formed integral with the neck portion communicates with receptacle 20. It should be appreciated that except for the necked portion and the pouring spout, the cylindrical side wall 12 is continuous and unbroken over its full height.

The cylindrical side wall 12 has an open top 24 which can be closed by a removable cover 23. The bottom of the cylinder, however, is closed by a closure 26 which can be either formed integral the cylindrical wall or can be separate cap member fixed to the cylindrical wall by any suitable means such as a solvent or ultrasonic welding.

Formed integral side wall 12 at the necked portion 14 is a first, internal annular shoulder 28.

Figure 2:
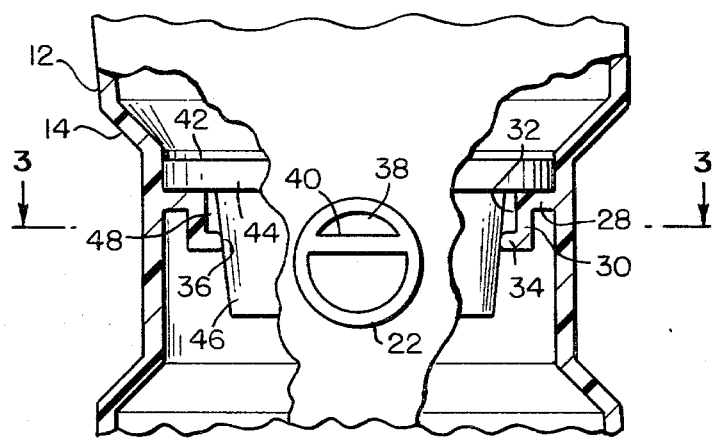
FIG. 2 is a side view of a portion of the unit shown in FIG. 1.

As best seen in FIG. 2, a flange 30 depends from about the inner periphery of shoulder 28. The inside diameter of this flange defines an opening 32. The lower end of flange 30 is provided with a second, internal annular shoulder 34 the inside diameter of which, defines a second opening 36. These two openings 32 and 36 provide the sole communication between the upper reservoir and the lower receptacle. The lower opening 36 is slightly smaller in diameter than the upper opening 32 for purposes set out hereinbelow.

As shown in FIGS. 1 and 2, spout 22 includes a breather tube 38. This tube is formed by a partition 40 which extends across the spout and extends back through the spout into receptacle 20 to intersect and merge with flange 34.

It should be appreciated that the body of the unit as thus far described can be molded in one piece, such as by injection molding from polystyrene, or other suitable plastic materials. Preferably the plastic should be of the type which is heat degraded so that the filtration unit cannot be sterilized and must be discarded after use.

The second major component of the filtration unit 10 is a filter medium support 42. This support comprises a perforated disc 44 having an integrally formed annular collar 46 which depends from the disc. It should be appreciated that the diameter of perforated disc 44 is substantially the same as the internal diameter of the necked portion 14. The outside diameter of collar 46 adjacent the disc is slightly less than the diameter of opening 32 so the collar fits easily through this opening as shown in FIG. 2. In addition, the collar 46 is tapered and is of a length sufficient to extend through the lower opening 36 in the lower shoulder 34 and slightly below the level of spout 22. The outside diameter of collar 46 where it extends through opening 36 is slightly greater than the inside diameter of this opening so as to provide an interference fit with the lower shoulder 34. With this arrangement, the filter medium support 42 can be fixed within the filtration unit 10 and against shoulder 28 simply by inserting the collar through openings 32 and 36 and thereafter attaching the periphery of disc 44 to the internal surface of the neck portion 14 by any suitable means such as ultrasonic welding or an appropriate solvent.

Figure 3:
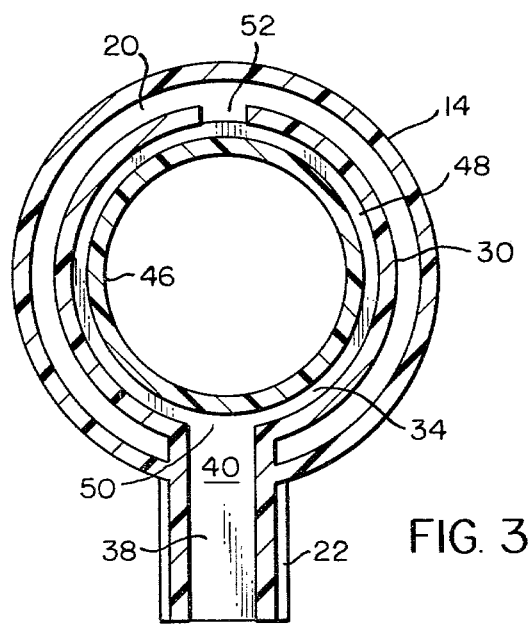
FIG. 3 is a view taken along lines 3—3 of FIG. 2.

Because collar 46 has an interference fit with the lower shoulder 34, an annular channel 48 is defined about the collar. As best seen in FIGS. 1 and 3 this channel 48 communicates with the breather tube 38 at 50 on one side of the collar 46 and communicates with receptacle 20 on the other side of the collar through a slot 52 formed in the depending flange 30. Except for these points of communication, channel 48 is otherwise closed by the tight fit of the collar 46 to the shoulder 34 on one level and the welding of the periphery of disc 44 to the neck portion 14 on an upper level. Thus, with the assembly as shown in FIG. 1, breather tube 38 opens into receptacle 20 only at 52 which is a point farthest from spout 22. This insures that when the filtration unit 10 is tipped to pour the contents of receptacle 20 through spout 22, the air entering the receptacle through breather tube 38 does not bubble through or otherwise come into active contact with the liquid in the receptacle. This minimizes any possible chemical reaction between the air and the filtrate or contamination of the filtrate by air borne bacteria carried by the air entering the receptacle.

To complete the filter, the upper surface of disc 44 is provided with a seat 54 to receive the appropriate filter medium 56. Such a filter medium can be any of various suitable materials such as a standard filter membrane having any desired degree of porosity. The attachment of the filter medium to disc 44 can be accomplished by sonic or heat sealing prior to the assembly of the filter support to the side wall of the necked portion 14 and shoulder 28.

In addition to being a pouring spout, spout 22 can also be attached by a conventional connector (not shown) to a suitable means for evacuating receptacle 20 so as to facilitate the filtration of liquid through the filter medium.

Thus, it should be appreciated that the present invention provides a filtration unit and a method of its manufacture which is an improvement over the state of the art. In this respect, molding the body of the unit in one piece, not only reduces the cost of manufacture, but also provides a unitary structure which eliminates any problems of air leaking into the receptacle from a point downstream of the filter medium. The present invention further allows for the complete assembly of the filtration unit in only two significant steps; namely, the attachment of a filter medium to support 42 and the attachment of the support to the wall of necked portion 14 and shoulder 38.

The filter unit of the present unit also provides a unique design for pouring filtrate from the the receptacle 20 without having the air which enters the receptacle actively contact the filtrate. In this respect, the collar 46, partition 40 and shoulder 34 cooperate to extend the length of breather tube 38 so as to locate the entrance of the breather tube at slot 52. This entrance is at a point where it is least likely that any air entering the receptacle will come into active contact with the filtrate in the receptacle as the filtrate is poured through spout 22. Moreover, by having collar 46 extend through the lower shoulder 34 and below the level of spout 16, there is little or no danger of filtrate aspirating through the spout as a vacuum is being drawn. Thus, the present invention does provide a simple easily manufactured and inexpensive disposable filtration unit.

Thus, having thus described the invention in detail, what is claimed as new is:

1. In a filtration unit including a container, an internal shoulder dividing said container into an upper reservoir and a lower receptacle and defining a first opening which provides communication between said reservoir and receptacle, a filter membrane support carried by said shoulder and having a depending collar extending through the first opening, and a pouring spout and a breather tube opening into said receptacle, the improvement comprising:
   (a) means cooperating with said collar to define a closed annular channel about said collar;
   (b) said channel having one end communicating with said breather tube on one side of said collar; and
   (c) said channel having a second end communicating with said receptacle on another side of said collar, whereby said breather tube opens into said receptacle through said annular channel.

2. A filter unit as in claim 1 wherein said means comprises:
   (a) a flange formed integral with and depending from said shoulder about said first opening, said flange being spaced from said collar to define spaced side walls of said annular channel; and
   (b) a second internal shoulder formed integral with the depending end of said flange, said second opening being aligned with said first opening for receiving said collar whereby said annular channel has its top defined by said first shoulder and its bottom defined by said second shoulder.

3. A filter unit as in claim 2 including a partition extending across and through said pouring spout to merge with said second shoulder, said breather tube being defined within said spout by said partition.

4. A filter unit as in claim 2 wherein the diameter of said second opening is smaller in diameter than said first opening and said collar is tapered so as to clear said first opening and interference fit with said second opening.

5. A filter unit as in claim 2 wherein said breather tube communicates with said channel through said flange, said flange having a slot remote from said breather tube providing the sole communication between said annular channel and said receptacle.

6. A unitary, one-piece plastic molded body for for use in assembling a disposable pressure filter, said body comprising:
   (a) an upright, generally cylindrical wall;
   (b) an internal annular shoulder on said wall dividing the internal volume of said cylindrical wall into upper and lower sections, said annular shoulder defining a first opening which provides communication between said upper and lower sections;
   (c) an annular flange depending from said shoulder about said opening, said flange having a slot;
   (d) a spout opening into said lower section, said spout being on a side of said wall diametrically opposite said slot;
   (e) a second internal shoulder on the lower end of said depending flange said second shoulder defining an opening which is axially aligned with and smaller in diameter than, said first opening; and
   (f) an air breather tube formed integral said spout, said tube extending through said spout with one end of said tube merging with and opening through said flange.

7. A disposable filtration unit comprising:
   (a) a container having an upright wall, an open top and a closed bottom;
   (b) a shoulder extending radially inward from the internal surface of said container wall intermediate its top and bottom to divide the volume of said container into an upper reservoir for receiving the liquid to be filtered and a lower receptacle for receiving the filtrate;
   (c) a perforated filter membrane support plate fixed about its periphery to said shoulder, said plate having a depending collar defining the sole passage from said reservoir to said receptacle;

(d) said shoulder and the outer periphery of said collar cooperating to define a closed channel therebetween;

(e) a breather tube extending through said cylindrical wall and communicating with said closed channel at a first point, said channel being open to said receptacle at a second point spaced from said first point; and (f) a pouring spout formed integral said container wall and communicating with said receptacle.

8. A disposable filtration unit as in claim 7 including means on said shoulder which cooperates with said collar to define said closed channel, said means comprising:

(a) a flange depending from said shoulder, said flange surrounding and being outwardly spaced from said collar; and (b) a lower portion of said depending flange extending inward to engage the periphery of said collar, whereby said shoulder defines the upper extent of said channel, said collar and depending flange define the sides of said channel and said lower portion defines the bottom of said channel.

9. A disposable filtration unit as in claim 8 wherein said breather tube opens through said flange at said first point and said flange has a slot therein at said second point.

10. A disposable filtration unit comprising:

(a) a container having an upright wall, an open top and closed bottom;

(b) a shoulder extending inward from about the internal surface of said wall intermediate the top and bottom thereof for dividing said container into an upper reservoir for receiving the liquid to be filtered and a lower receptacle for receiving filtrate;

(c) a flange depending from said shoulder and defining a first opening, the lower portion of said flange extending radially inward to define a second opening axially aligned with said first opening;

(d) a spout formed integral said cylindrical wall, said spout including a partition which extends axially back through said spout to said depending flange, said partition dividing said spout into a lower passage which communicates with said receptacle and an upper passage which opens through said flange;

(e) a filter membrane support plate sealed about its periphery to said shoulder;

(f) an annular collar depending from said support plate and extending into said receptacle,
said collar having a clearance fit with said first opening as defined by said flange and an interference fit with said second opening as defined by said lower flange portion;

(g) said collar and flange defining a space therebetween extending about said collar and communicating with said upper passage; and (h) said flange having an opening to said receptacle whereby air passing into said upper passage and into said space about said collar can enter said receptacle.

* * * * *